(12) United States Patent
Huang et al.

(10) Patent No.: US 11,368,482 B2
(45) Date of Patent: Jun. 21, 2022

(54) THREAT DETECTION SYSTEM FOR MOBILE COMMUNICATION SYSTEM, AND GLOBAL DEVICE AND LOCAL DEVICE THEREOF

(71) Applicant: Institute For Information Industry, Taipei (TW)

(72) Inventors: Yen-Wen Huang, Taipei (TW); Yi-Hsueh Tsai, Taipei (TW); Shu-Min Chuang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 393 days.

(21) Appl. No.: 16/777,865

(22) Filed: Jan. 30, 2020

(65) Prior Publication Data

US 2021/0211458 A1 Jul. 8, 2021

(30) Foreign Application Priority Data

Jan. 6, 2020 (TW) .................................. 109100331

(51) Int. Cl.
| | |
|---|---|
| *H04L 9/40* | (2022.01) |
| *G06F 21/55* | (2013.01) |
| *H04L 47/27* | (2022.01) |
| *H04L 47/193* | (2022.01) |
| *H04L 67/025* | (2022.01) |
| *G06N 3/08* | (2006.01) |
| *G06N 3/04* | (2006.01) |
| *G06T 15/00* | (2011.01) |
| *H04L 69/16* | (2022.01) |

(52) U.S. Cl.
CPC ........ *H04L 63/1458* (2013.01); *G06F 21/554* (2013.01); *G06N 3/04* (2013.01); *G06N 3/084* (2013.01); *G06T 15/00* (2013.01); *H04L 47/193* (2013.01); *H04L 47/27* (2013.01); *H04L 63/1416* (2013.01); *H04L 67/025* (2013.01); *H04L 69/16* (2013.01); *H04L 2463/121* (2013.01); *H04L 2463/141* (2013.01); *H04L 2463/143* (2013.01)

(58) Field of Classification Search
CPC ... H04L 63/1458; H04L 47/193; H04L 47/27; H04L 63/1416; H04L 67/025; H04L 69/16; H04L 2463/121; H04L 2463/141; H04L 2463/143; G06F 21/554; G06N 3/04; G06N 3/084; G06T 15/00
See application file for complete search history.

(56) References Cited

U.S. PATENT DOCUMENTS

| | | | | |
|---|---|---|---|---|
| 2013/0305357 | A1* | 11/2013 | Ayyagari | H04W 12/06 726/22 |
| 2015/0213358 | A1* | 7/2015 | Shelton | H04L 41/0636 706/47 |
| 2021/0216928 | A1* | 7/2021 | O'Toole | G06F 16/29 |

* cited by examiner

*Primary Examiner* — Duc C Ho
(74) *Attorney, Agent, or Firm* — CKC & Partners Co., LLC

(57) ABSTRACT

A threat detection system for a mobile communication system, and a global device and a local device thereof are provided. The threat detection system is used for detecting and defensing low and slow distributed denial-of-service (LSDDoS) attacks. The global device is located in a core network of the mobile communication system, and is used for training a tensor neural network (TNN) model to build a threat classifier. The threat classifier is used for the local device to identify a plurality of threat types. The local device inputs the to-be-identified data into the threat classifier to generate a classification result corresponding to one of the threat types.

20 Claims, 5 Drawing Sheets

THREAT DETECTION SYSTEM FOR MOBILE COMMUNICATION SYSTEM, AND GLOBAL DEVICE AND LOCAL DEVICE THEREOF

PRIORITY

This application claims priority to Taiwan Patent Application No. 109100331 filed on Jan. 6, 2020, which is hereby incorporated by reference in its entirety.

FIELD

The present invention relates to a threat detection system for a mobile communication system, and a global device and a local device thereof. Specifically, the global device of the threat detection system in the present invention trains a tensor neural network (TNN) model to build a threat classifier for the local device to identify low and slow distributed denial-of-service (LSDDoS) threat types.

BACKGROUND

With the development of the wireless communication technologies, wireless communication has found wide application in people's life, and people's demand for wireless communication is increasing. As the deployment of the mobile communication system (e.g., the 4G mobile communication system and the 5G mobile communication system) progresses, in addition to smartphones and tablet computers which are common in use now, more and more electronic devices have begun to provide a built-in communication function, e.g., the current popular narrowband internet of things (NB-IoT) devices. Under such circumstance, there are unscrupulous people who have used the mobile communication system network to attack a server of a specific enterprise or a server in the core network of the mobile communication system to make the server unable to work abnormally by crashing it or overloading it.

A distributed denial-of-service (DDoS) attack is a common and long-standing attack method which makes a server extremely busy in a moment to be crashed by sending a lot of packets to it, establishing a lot of connections with it or sending various and confused instructions to it in a distributed manner. The conventional DDoS attacks mainly use transport layer protocols. Since the defense mechanism for the conventional DDoS attacks has become mature in the recent years, unscrupulous people begin to use the application layer protocols for launching DDoS attacks. The application layer protocols used in the DDoS attacks are high layer protocols (e.g., Hypertext Transfer Protocol (HTTP)) which are suitable for developing various and complex attack methods.

A low and slow distributed denial-of-service (LSDDoS) attack belongs to one of the DDoS attacks using the application layer protocols. Compared to the conventional DDoS attacks, the LSDDoS attack has a slower attack speed and a lower flow rate so it is hard to be detected based on the flow rate. However, the LSDDoS attack still can exhaust the server's resources gradually and make the server almost be crashed eventually. Accordingly, an urgent need exists in the art to provide a threat detection mechanism to detect an LSDDoS attack and identify its threat type so as to take an appropriate defense.

SUMMARY

An objective of certain embodiments of the invention is to provide a threat detection mechanism which sets up a threat detection system for a mobile communication system by using a global device to train a tensor neural network (TNN) model to build a threat classifier for a local device to identify LSDDoS threat types. Therefore, the threat detection mechanism is able to detect dynamic behaviors of an LSDDoS attack and identify the threat type of the LSDDoS attack so as to take an appropriate defense.

The disclosure includes a threat detection system for a mobile communication system. The threat detection system comprises a global device and a local device. The global device is located in a core network of the mobile communication system and is configured to perform the following operations: receiving a plurality of training data from a local device, each of the training data being constituted by a plural of training flow data within a time interval at which numbers of packets per second are larger than a threshold; inputting the training data into a tensor neural network (TNN) model to train the TNN model and build a threat classifier, the threat classifier being used for identifying a plurality of threat types; and transmitting the threat classifier to the local device. The local device is configured to perform the following operations: receiving the threat classifier from the global device; retrieving a plurality of to-be-identified flow data within another time interval at which numbers of packets per second are larger than the threshold to generate a to-be-identified datum; and inputting the to-be-identified datum into the threat classifier to generate a classification result corresponding to one of the threat types.

The disclosure also includes a threat detection system for a mobile communication system. The threat detection system comprises the global device and a local device. The global device is located in a core network of the mobile communication system. The global device comprises a network interface and a processor. The network interface is configured to connect to the local device. The processor is electrically connected to the network interface and is configured to perform the following operations: receiving a plurality of training data from the local device, each of the training data being constituted by a plural of training flow data within a time interval at which numbers of packets per second are larger than a threshold; inputting the training data into a tensor neural network (TNN) model to train the TNN model and build a threat classifier, the threat classifier being used for identifying a plurality of threat types; and transmitting the threat classifier to the local device via the network interface to make the local device retrieve a plurality of to-be-identified flow data within another time interval, at which numbers of packets per second are larger than the threshold, to generate a to-be-identified datum and input the to-be-identified datum into the threat classifier to generate a classification result corresponding to one of the threat types.

The disclosure further includes a local device of a threat detection system for a mobile communication system. The threat detection system comprising a global device and the local device. The global device is located in a core network of the mobile communication system. The local device comprises a network interface and a processor. The network interface is configured to connect to the global device. The processor is electrically connected to the network interface and is configured to perform the following operations: retrieving a plurality of training data, each of the training data being constituted by a plural of training flow data within a time interval at which numbers of packets per second are larger than a threshold; transmitting the training data to the global device via the network interface to make the global device input the training data into a tensor neural network (TNN) model to train the TNN model and build a threat classifier, the threat classifier being used for identifying a plurality of threat types; receiving the threat classifier from the global device via the network interface; retrieving a plurality of to-be-identified flow data within another time interval at which numbers of packets per second are larger than the threshold to generate a to-be-identified datum; and inputting the to-be-identified datum into the threat classifier to generate a classification result corresponding to one of the threat types.

The detailed technology and preferred embodiments implemented for the present invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific example, embodiment, environment, applications or particular implementations described in these example embodiments. Therefore, description of these example embodiments is only for purpose of illustration rather than to limit the present invention.

Figure 1:
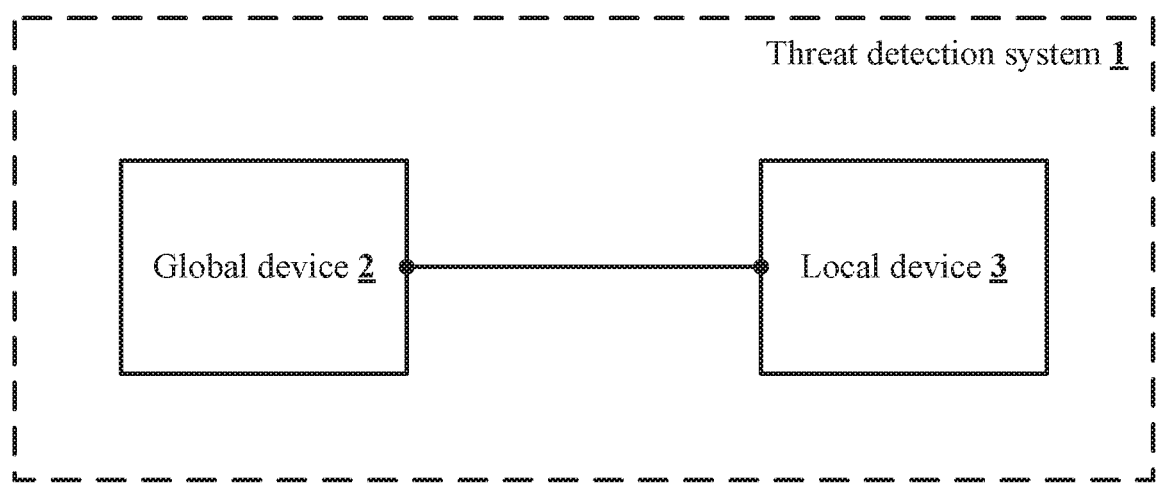
FIG. 1 is a schematic view of the threat detection system 1 according to the present invention.
Figure 2:
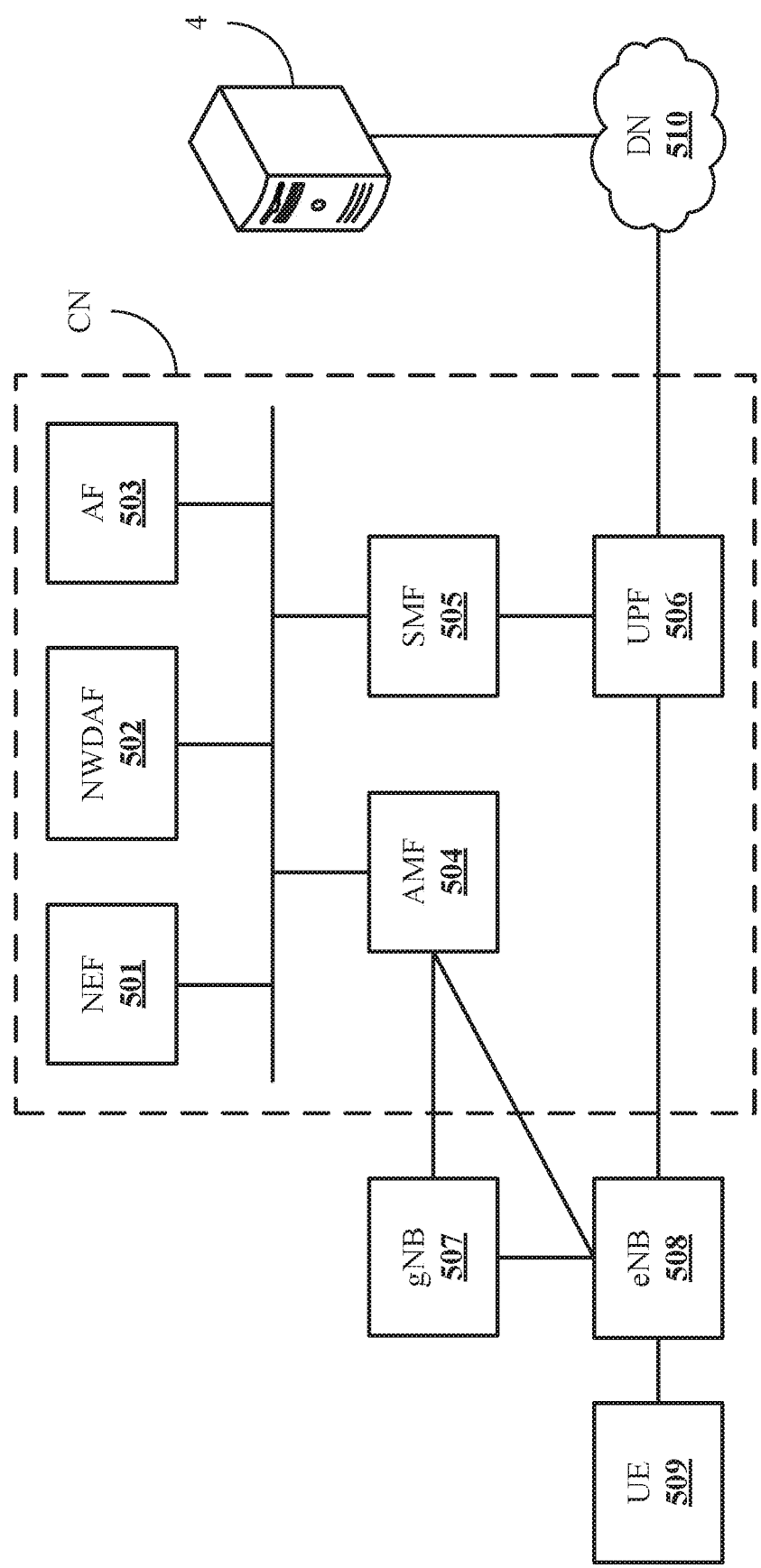
FIG. 2 is a schematic view of a mobile communication system network structure applicable to the threat detection system 1 of the present invention.

Please refer to FIG. 1 to FIG. 4 for the first embodiment of the present invention. As shown in FIG. 1, the threat detection system 1 includes a global device 2 and a local device 3. The threat detection system 1 is adapted for a mobile communication system, e.g., the 5G mobile communication system (but not limited thereto). The global device 2 is located in a core network CN of the mobile communication system. As shown in FIG. 2, the core network CN may be used for providing with the following functions: a network exposure function (NEF) 501, a network data analytics function (NWDAF) 502, an application function (AF) 503, an access and mobility management function (AMF) 504, a session management function (SMF) 505 and a user plane function (UPF) 506.

The core network CN may include one or more devices (e.g., servers) to implement the above functions by hardware or software. Those functions may be connected to each other via specific interfaces (e.g., the SMF 505 and the UPF 506 are connected via the N4 interface). It shall be appreciated that the connection interfaces among those functions are well-known to those of ordinary skill in the art, and thus will not be further described herein.

The global device 2 may be the device executing the NWDAF 502 (but not limited thereto). The local device 3 may be the device executing the other function of the core network CN (e.g., the AMF 504), or the other device which does not belong to the core network CN such as the base station (e.g., the base station 507 in the 5G mobile communication system (usually called "gNB" or the base station 508 in the 4G mobile communication system (usually called "eNB"). The user equipment (UE) 509 may be a smartphone or a NB-IoT device (but not limited thereto).

Figure 3:
FIG. 3 depicts an implementation scenario of training a tensor neural network (TNN) model TM according to the present invention.

As shown in FIG. 3, the global device 2 receives a plurality of training data 302 from the local device 3. Each of the training data 302 is constituted by a plural of training flow data within a time interval at which numbers of packets per second are larger than a threshold.

The threshold may be associated with an average daily package amount. The training data 302 are constituted by the training flow data belonging to the known threat types. In other words, the person, who sets up the threat detection system 1, can generates the packets belonging to various LSDDoS attack types through multiple UEs (i.e., simulating dynamic behaviors of the attacker), and transmits the packets via the mobile communication system network for the local device 3 to retrieve the information of the these packets and generate the training flow data. Afterwards, the local device 3 provides the training data 302 constituted by the training flow data to the global device 2 for the global device 2 to train the machine learning model or deep learning model and build the threat classifier for use in the local device 3.

Specifically, the local device 3 starts to retrieve information from the packets at a first time point, at which the local device 3 determines that the number of packets per second exceeds the threshold, to generate the training flow data until a second time point, at which the local device 3 determines that the number of packets per second falls to less than the threshold, and stops retrieving information from the packets and generating the training flow data so as to take the collected training flow data between the first time point and the second time point as one training datum 302.

As aforementioned, the threshold may be associated with the average daily package amount. For example, on the assumption that the average daily package amount is 10 million per day and the radio is set to 0.2, the threshold may be set to the average daily package amount multiplied by the radio, i.e., the threshold is 2 million. When determining that the number of packets per second exceeds 2 million at 15:10:00, the local device 3 starts to retrieve information from the packets to generate the training flow data, and when determining that the number of packets per second falls to less than 2 million at 15:10:30, the local device 3 stops retrieving information from the packets and generating training flow data. Therefore, the local device 3 takes the collected training flow data between 15:10:10 to 15:10:29 as one training datum 302, and transmits this training datum 302 to the global device 2. Afterwards, following the above operations, the local device 3 will obtain the training flow data at other time intervals, during which the numbers of packets per second are larger than the threshold, to generate other training data 302.

Figure 4:
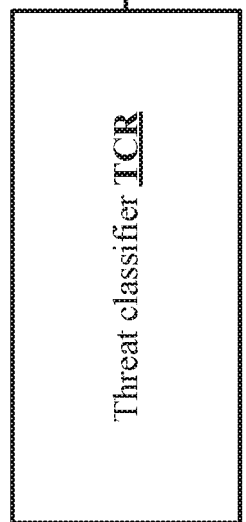
FIG. 4 depicts an implementation scenario of analyzing the to-be-identified datum 304 through the threat classifier TCR according to the present invention.

Next, as shown in FIG. 4, after obtaining these training data 302, the global device 2 inputs the training data 302 into a tensor neural network (TNN) model TM to generate a plurality of training classification results 202 so as to train the TNN model TM and build a threat classifier TCR. The global device 2 transmit the threat classifier TCR to the local device 3 for the threat classifier to identify the threat types by using the threat classifier TCR. In the present invention, the training method may be supervised (but not limited thereto) to label each of the training classification results 202 to one of the threat types. The TNN model TM may be a neural network model based on the backpropagation algorithm (but not limited thereto), and the data calculated by it are represented by a tensor (e.g., represented by a three-dimensional coordinate system). It shall be appreciated by those of ordinary skill in the art, that any machine learning models or deep learning models which support the tensor operations can be used as the TNN model TM of the present application to build the threat classifier TCR of the present invention, and thus will not be further described herein.

After receiving the threat classifier TCR from the global device 2, the local device 3 retrieves a plurality of to-be-identified flow data within another time interval at which numbers of packets per second are larger than the threshold to generate a to-be-identified datum 304, and inputs the to-be-identified datum 304 into the threat classifier TCR to generate a classification result 306. The classification result 306 corresponds to one of the threat types.

As it can be learned from the above descriptions, the local device 3 is mainly used for retrieving the packet information and identify the threats, while the global device 2 is mainly used for training the machine learning model or the deep learning model (i.e., the TNN model) to build the threat classifier TCR which is suitable for the local device 3.

In one embodiment, the local device 3 may record several classification results 306 and reports these classification results 306 to the global device 2. The global device 2 further calculates an error rate of the threat classifier TCR according to these classification results 306 to update the threshold, and re-trains the TNN model TM to update the threat classifier TCR in response to the updated threshold and transmits the updated threat classifier TCR to the local device 3. In other words, the global device 2 may retrain the TNN model TM to build the new threat classifier TCR occasionally to increase the identification correct rate by monitoring the identification failure rate of the threat classifier TCR at the local device 3.

Besides, in other embodiments, the global device 2 may re-train the TNN model TM to update the threat classifier TCR based on a scheduled period. In other words, the global device 2 may update or newly add the training data 302 periodically (e.g., every one or more weeks, or every one or more months) to re-train the TNN model TM to build new threat classifiers TCR for increasing the identification correct rate.

Please also refer to FIG. 1 to FIG. 4 for the second embodiment of the present invention. The second embodiment is an extension of the first embodiment. In this embodiment, each of the training data 302 and the to-be-identified datum 304 is a packet datum. In detail, if the destination of the packets is a device not belonging to the core network CN (e.g., the external server 4 which the packets generated by the UE 509 are transmitted to through the core network CN via the data network (DN) 510), the local device 3 determines that the training data 302 and the to-be-identified datum 304, which are generated based on information of these packets, belong to packet data. In addition, the local device 3 may use a sniffing tool (e.g., tcpdump) to collect the information of each packet.

For the packets whose destination is the external server 4, the local device 3 retrieves a timestamp, a source internet protocol (IP) address, a keep-alive field and a content-length field of a hypertext transfer protocol (HTTP) header, and a sliding window field and a retransmission time-out field of a transmission control protocol (TCP) from each packet to obtain one training flow datum, and represents each training flow datum by a tensor structure.

The tensor structure of each training flow data is represented by a three-dimensional coordinate system. The three-dimensional coordinate system has a first dimension, a second dimension and a third dimension. The first dimension represents a first value constituted by the timestamp, the second dimension represents a second value constituted by the source IP address, and the third dimension represents a third value constituted by the keep-alive field and the content-length field of the HTTP header and the sliding window field and the retransmission time-out field of the TCP.

Afterward, the local device 3 transmits the training data 302 to the global device 2, and the global device 2 inputs the training data 302 into the TNN model TM to train the TNN model TM and build the threat classifier TCR. The global device 2 transmits the threat classifier TCR to the local device 3 for the local device 3 to identify the threat type of the to-be-identified datum 304 by using the threat classifier TCR. In other words, for the packets whose destination is the external server 4, the local device 3 retrieves the timestamp, the source IP address, the keep-alive field and the content-length field of the HTTP header, and the sliding window field and the retransmission time-out field of the TCP from each packet to obtain one to-be-identified flow datum, and represents each to-be-identified flow datum by the tensor structure. Finally, the local device 3 generates the to-be-identified datum 304 based on the generated to-be-identified flow data within a specific interval (i.e., an interval at which numbers of packets per second are larger than the threshold), and inputs the to-be-identified datum 304 into the threat classifier TCR to obtain the classification result 306. As aforementioned, the classification result 306 corresponds to one of the threat types.

Further speaking, the packet data have characteristics of heavy traffic load and simple service. For example, the threat types may include three packet threat types: (i) the first packet threat type is about "requesting to maintain connectivity by continuously transmitting incomplete messages"; (ii) the second packet threat type is about "requesting the destination to transmit super long messages, but in the case that the source transmits a short message each time and the interval is long and not fixed"; and (iii) the third packet threat type is about "occupying large service resources by requesting to set the sliding window." The classification result 306 may be a vector with three elements, and the three elements represent the probabilities corresponding to the three packet threat types respectively. The element with the highest probability indicates the packet threat type which the classification result 306 corresponds to.

After determining that the to-be-identified datum 304 belongs to one of the three packet threat types according to the classification result 306, the local device 3 will take an appropriate defense. For example, if the to-be-identified datum 304 shows that the source continuously transmits incomplete messages (i.e., the messages do not include \r\n\r\n (0d0a0d0a)), then the classification result 306 corresponds to the first packet threat type. In this case, the local device 3 can take a defense against the attack of this packet threat type by setting the maximum number of allowed waits to "(1−the probability corresponding to the first packet threat type) multiplied by the default number of allowed waits" and terminating the connection when the maximum number of allowed waits is reached.

In another example, if the to-be-identified datum 304 shows that the source transmits a byte per 10 to 100 seconds, then the classification result 306 corresponds to the second packet threat type. In this case, the local device 3 can take a defense against the attack of this packet threat type by setting the maximum allowed transmission time interval to "(1−the probability corresponding to the second packet threat type) multiplied by (1+the average transmission time interval)."

In another example, if the to-be-identified datum 304 presents frequent changes of TCP parameters on the source side to control the size of the datum sent by the destination side at a time, then the classification result 306 corresponds to the third packet threat type. In this case, the local device 3 can take a defense against the attack of this packet threat type by setting the maximum allowed size of the sliding window to "(1−the probability corresponding to the third packet threat type) multiplied by (1+the average size of the sliding window)."

Please also refer to FIG. 1 to FIG. 4 for the third embodiment of the present invention. The third embodiment is also an extension of the first embodiment. In this embodiment, each of the training data 302 and the to-be-identified datum 304 is a queue datum. In detail, if the destination of the packets is a device in the core network CN, e.g., the device executing the AMF 504, the local device 3 determines that the training data 302 and the to-be-identified datum 304, which are generated based on information of these packets, belong to queue data. Likewise, the local device 3 may use the sniffing tool (e.g., tcpdump) to collect the information of each packet.

For the packets whose destination is the device in the core network CN, the local device 3 retrieves a timestamp, a destination IP address, a number of reject-session times, a parsing time and a processing time from each packet to obtain one training flow datum, and represents each training flow datum by a tensor structure. Likewise, the tensor structure of each training flow data is represented by a three-dimensional coordinate system. The three-dimensional coordinate system has a first dimension, a second dimension and a third dimension. However, different from the second embodiment, for the queue data in this embodiment, the first dimension represents a first value constituted by the timestamp, the second dimension represents a second value constituted by the destination IP address, and the third dimension represents a third value constituted by the number of reject-session times, the parsing time and the processing time.

The local device 3 transmits the training data 302 to the global device 2, and the global device 2 inputs the training data 302 into the TNN model TM to train the TNN model TM and build the threat classifier TCR. The global device 2 transmits the threat classifier TCR to the local device 3 for the local device 3 to identify the threat type of the to-be-identified datum 304 by using the threat classifier TCR. In other words, for the packets whose destination is the device in the core network CN, the local device 3 retrieves the timestamp, the destination IP address, the number of reject-session times, the parsing time and the processing time from each packet to obtain one to-be-identified flow datum, and represents each to-be-identified flow datum by the tensor structure. Finally, the local device 3 generates the to-be-identified datum 304 based on the generated to-be-identified flow data within a specific interval (i.e., an interval at which numbers of packets per second are larger than the threshold), and inputs the to-be-identified datum 304 into the threat classifier TCR to obtain the classification result 306. As aforementioned, the classification result 306 corresponds to one of the threat types.

Further speaking, the queue data have characteristics of slight traffic load and complex service. For example, the threat types may include four queue threat types: (i) the first queue threat type is about "causing the congestion control to be activated to decrease the network throughput by a retransmission or recovery mechanism"; (ii) the second queue threat type is about "causing the subsequent connections to be rejected by keeping too many data or allowing too long packet header being stored in the register or cache"; (iii) the third queue threat type is about "consuming resources at the front and back ends of the host by applying rules which are simple and legal but with logic bombs"; and (iv) the fourth queue threat type is about "consuming parsing resources at the front and back ends by applying rules which are complex and legal." The classification result 306 may be a vector with four elements, and the four elements represent the probabilities corresponding to the four queue threat types respectively. The element with the highest probability indicates the queue threat type which the classification result 306 corresponds to.

After determining that the to-be-identified datum 304 belongs to one of the four queue threat types according to the classification result 306, the local device 3 will take an appropriate defense. For example, if the to-be-identified datum 304 shows that the congestion control is activated to decrease the network throughput because of the retransmission or recovery mechanism, then the classification result 306 corresponds to the first queue threat type. In this case, the local device 3 can take a defense against the attack of this queue threat type by setting the retransmission timeout value to "(1−the probability corresponding to the first queue threat type) multiplied by the default retransmission timeout value".

In another example, if the to-be-identified datum 304 shows that the subsequent connections are rejected due to keeping too many data or allowing too long packet header being stored in the register or cache, then the classification result 306 corresponds to the second queue threat type. In this case, the local device 3 can take a defense against the attack of this queue threat type by cleaning up the temporary data stored in the register or cache.

In another example, if the to-be-identified datum 304 includes a concatenation of a large number of independent instructions for creating logic bombs to make the target service end have an invalid result and consume its resources, then the classification result 306 corresponds to the third queue threat type. In this case, the local device 3 can take a defense against the attack of this queue threat type by setting the maximum allowed response time to "(1−the probability corresponding to the third queue threat type) multiplied by (1+the average response time)."

In another example, if the to-be-identified datum 304 includes a combination of a large number of join type instructions (e.g., Boolean Operation instructions) for searching to make the target service end consume a lot of its index resources, then the classification result 306 corresponds to the fourth queue threat type. In this case, the local device 3 can take a defense against the attack of this queue threat type by setting the maximum allowed response time to "(1−the probability corresponding to the fourth queue threat type) multiplied by (1+the average response time)."

It shall be noted that the aforesaid three packet threat types in the second embodiment and the four queue threat types in the third embodiment are given as examples only. In addition, based on the foregoing descriptions, those of ordinary skill in the art would appreciate that the threat detection system 1 of the present application is capable of training the TNN models for other numbers of packet threat types and other numbers of queue threat types to build multiple different threat classifiers TCR. The global device 2 may save various threat classifiers TCR, and replace the threat classifier TCR or its parameters (also known as hyperparameters) of the local device 3 based on the actual needs (the change of threat types or the change of environment), so as to carry out the defense in accordance with the actual needs. Furthermore, depending on the role (i.e., the functions and capabilities) of the different the local devices 3, each local device 3 may have either a packet threat type classifier or a queue threat type classifier, or both.

Figure 5:
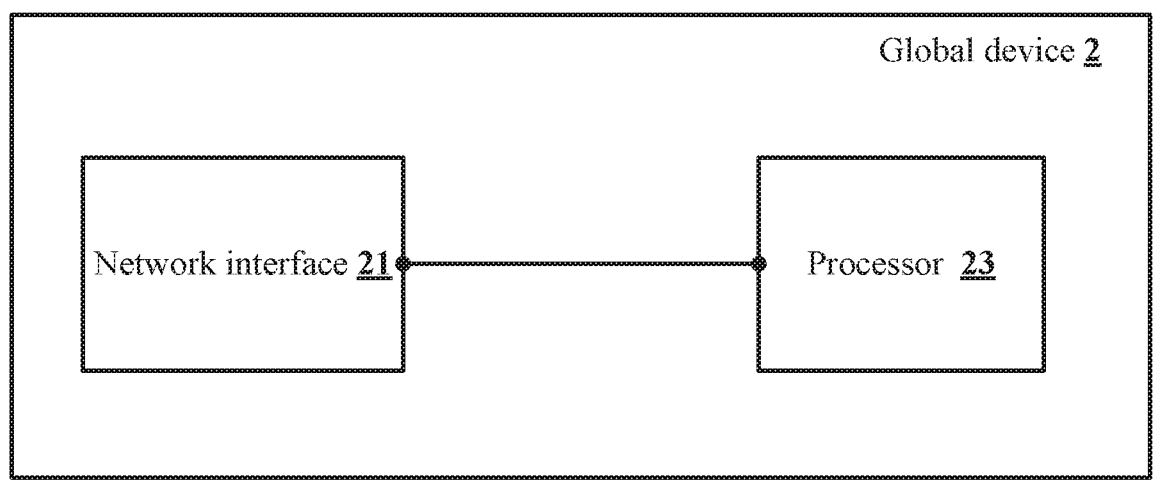
FIG. 5 is a schematic view of the global device 2 according to the present invention.

A fourth embodiment of the present invention is as shown in FIG. 5, which is a schematic view of the global device 2 according to the present invention. The global device 2 includes a network interface 21 and a processor 23. The processor 23 is electrically connected to the network interface 21. It shall be appreciated that, for simplifying the description, other components of the global device 2 such as the storage, the housing, the power supply module and other components irrelevant to the present invention are omitted from depiction in the drawings. The processor 23 may be any of various processors, Central Processing Units (CPUs), microprocessors, digital signal processors, or other computing devices being capable of performing a machine learning or a deep learning and being known to those of ordinary skill in the art.

Corresponding to the first embodiment, the network interface 21 is configured to connect to the local device 3. The processor 23 receives a plurality of training data 302 from the local device. Each of the training data 302 is constituted by a plural of training flow data within a time interval at which numbers of packets per second are larger than a threshold. The processor 23 inputs the training data into the TNN model TM to train the TNN model TM and build the threat classifier TCR. The threat classifier TCR is used for identifying a plurality of threat types. The processor 23 transmits the threat classifier TCR to the local device 3 via the network interface 21 to make the local device 3 retrieve a plurality of to-be-identified flow data within another time interval, at which numbers of packets per second are larger than the threshold, to generate a to-be-identified datum and input the to-be-identified datum into the threat classifier to generate a classification result 306. The classification result 306 corresponds to one of the threat types.

In one embodiment, the threshold is associated with an average daily package amount.

Corresponding to the second embodiment, each of the training data 302 and the to-be-identified datum 304 is a packet datum, and each of the training flow data and the to-be-identified flow data is represented by the three-dimensional coordinate system. The three-dimensional coordinate system has a first dimension, a second dimension and a third dimension. The first dimension represents the first value constituted by the timestamp. The second dimension represents the second value constituted by the source IP address. The third dimension represents the third value constituted by the keep-alive field and the content-length field of the HTTP header and the sliding window field and the retransmission time-out field of the TCP.

Corresponding to the third embodiment, each of the training data 302 and the to-be-identified datum 304 is a queue datum, and each of the training flow data and the to-be-identified flow data is represented by the three-dimensional coordinate system. The three-dimensional coordinate system has a first dimension, a second dimension and a third dimension. The first dimension represents the first value constituted by the timestamp. The second dimension represents the second value constituted by the destination IP address. The third dimension represents the third value constituted by the number of reject-session times, the parsing time and the processing time.

Figure 6:
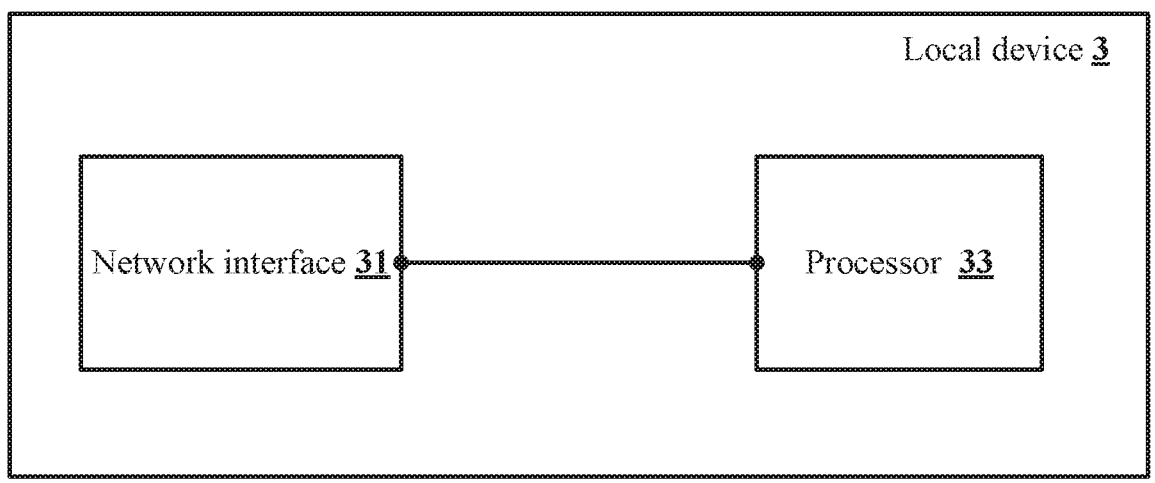
FIG. 6 is a schematic view of the local device 3 according to the present invention.

A fifth embodiment of the present invention is as shown in FIG. 6, which is a schematic view of the local device 3 according to the present invention. The local device 3 includes a network interface 31 and a processor 33. The processor 33 is electrically connected to the network interface 31. It shall be appreciated that, for simplifying the description, other components of the local device 3 such as the storage, the housing, the power supply module and other components irrelevant to the present invention are omitted from depiction in the drawings. The processor 33 may be any of various processors, Central Processing Units (CPUs), microprocessors, digital signal processors, or other computing devices being known to those of ordinary skill in the art.

Corresponding to the first embodiment, the network interface 31 is configured to connect to the global device 2. The processor 33 retrieves a plurality of training data 302. Each of the training data 302 is constituted by a plural of training flow data within a time interval at which numbers of packets per second are larger than a threshold. The processor 33 transmits the training data 302 to the global device 2 via the network interface 31 to make the global device 2 input the training data 302 into the TNN model TM to train the TNN model TM and build the threat classifier TCR. The threat classifier TCR is used for identifying a plurality of threat types. The processor 33 receives the threat classifier TCR from the global device 2 via the network interface 31. The processor 33 retrieves a plurality of to-be-identified flow data within another time interval at which numbers of packets per second are larger than the threshold to generate the to-be-identified datum 304. The processor 33 inputs the to-be-identified datum 304 into the threat classifier TCR to generate the classification result 306. The classification result 306 corresponds to one of the threat types.

In one embodiment, the threshold is associated with an average daily package amount.

Corresponding to the second embodiment, each of the training data 302 and the to-be-identified datum 304 is a packet datum, and each of the training flow data and the to-be-identified flow data is represented by the three-dimensional coordinate system. The three-dimensional coordinate system has a first dimension, a second dimension and a third dimension. The first dimension represents the first value constituted by the timestamp. The second dimension represents the second value constituted by the source IP address. The third dimension represents the third value constituted by the keep-alive field and the content-length field of the HTTP header and the sliding window field and the retransmission time-out field of the TCP.

Corresponding to the third embodiment, each of the training data 302 and the to-be-identified datum 304 is a queue datum, and each of the training flow data and the to-be-identified flow data is represented by the three-dimensional coordinate system. The three-dimensional coordinate system has a first dimension, a second dimension and a third dimension. The first dimension represents the first value constituted by the timestamp. The second dimension represents the second value constituted by the destination IP address. The third dimension represents the third value constituted by the number of reject-session times, the parsing time and the processing time.

According to the above descriptions, which threat detection system 1 uses the global device to trains the TNN models to build the threat classifiers for the local device to identify different LSDDoS threat types for the internal device of the core network or the external device. Therefore, the threat detection mechanism of the present invention is able to detect the LSDDoS attack and identify its threat type so as to take an appropriate defense.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A threat detection system for a mobile communication system, comprising:
   a global device, being located in a core network of the mobile communication system and configured to perform the following operations:
      receiving a plurality of training data from a local device, each of the training data being constituted by a plural of training flow data within a time interval at which numbers of packets per second are larger than a threshold;
      inputting the training data into a tensor neural network (TNN) model to train the TNN model and build a threat classifier, the threat classifier being used for identifying a plurality of threat types; and
      transmitting the threat classifier to the local device; and
   the local device, being configured to perform the following operations:
      receiving the threat classifier from the global device;
      retrieving a plurality of to-be-identified flow data within another time interval at which numbers of packets per second are larger than the threshold to generate a to-be-identified datum; and
      inputting the to-be-identified datum into the threat classifier to generate a classification result corresponding to one of the threat types.

2. The threat detection system of claim 1, wherein each of the training data and the to-be-identified datum is a packet datum, and each of the training flow data and the to-be-identified flow data is represented by a three-dimensional coordinate system.

3. The threat detection system of claim 2, wherein the three-dimensional coordinate system has a first dimension, a second dimension and a third dimension, the first dimension represents a first value constituted by a timestamp, the second dimension represents a second value constituted by a source internet protocol (IP) address, and the third dimension represents a third value constituted by a keep-alive field and a content-length field of a hypertext transfer protocol (HTTP) header and a sliding window field and a retransmission time-out field of a transmission control protocol (TCP).

4. The threat detection system of claim 1, wherein each of the training data and the to-be-identified datum is a queue datum, and each of the training flow data and the to-be-identified flow data is represented by a three-dimensional coordinate system.

5. The threat detection system of claim 4, wherein the three-dimensional coordinate system has a first dimension, a second dimension and a third dimension, the first dimension represents a first value constituted by a timestamp, the second dimension represents a second value constituted by a destination internet protocol (IP) address, and the third dimension represents a third value constituted by a number of reject-session times, a parsing time and a processing time.

6. The threat detection system of claim 1, wherein the global device further calculates an error rate of the threat classifier to update the threshold, and in response to the updated threshold, re-trains the TNN model to update the threat classifier and transmits the updated threat classifier to the local device.

7. The threat detection system of claim 1, wherein the global device further re-trains the TNN model to update the threat classifier based on a scheduled period.

8. The threat detection system of claim 1, wherein the threshold is associated with an average daily package amount.

9. A global device of a threat detection system for a mobile communication system, the threat detection system comprising the global device and a local device, the global device being located in a core network of the mobile communication system, the global device comprising:
   a network interface, being configured to connect to the local device;
   a processor, being electrically connected to the network interface and being configured to perform the following operations:
      receiving a plurality of training data from the local device, each of the training data being constituted by a plural of training flow data within a time interval at which numbers of packets per second are larger than a threshold;
      inputting the training data into a tensor neural network (TNN) model to train the TNN model and build a threat classifier, the threat classifier being used for identifying a plurality of threat types; and
      transmitting the threat classifier to the local device via the network interface to make the local device retrieve a plurality of to-be-identified flow data within another time interval, at which numbers of packets per second are larger than the threshold, to generate a to-be-identified datum and input the to-be-identified datum into the threat classifier to generate a classification result corresponding to one of the threat types.

10. The global device of claim 9, wherein each of the training data and the to-be-identified datum is a packet datum, and each of the training flow data and the to-be-identified flow data is represented by a three-dimensional coordinate system.

11. The global device of claim 10, wherein the three-dimensional coordinate system has a first dimension, a second dimension and a third dimension, the first dimension represents a first value constituted by a timestamp, the second dimension represents a second value constituted by a source internet protocol (IP) address, and the third dimension represents a third value constituted by a keep-alive field and a content-length field of a hypertext transfer protocol (HTTP) header and a sliding window field and a retransmission time-out field of a transmission control protocol (TCP).

12. The global device of claim 9, wherein each of the training data and the to-be-identified datum is a queue datum, and each of the training flow data and the to-be-identified flow data is represented by a three-dimensional coordinate system.

13. The global device of claim 12, wherein the three-dimensional coordinate system has a first dimension, a second dimension and a third dimension, the first dimension represents a first value constituted by a timestamp, the second dimension represents a second value constituted by a destination internet protocol (IP) address, and the third dimension represents a third value constituted by a number of reject-session times, a parsing time and a processing time.

14. The global device of claim 9, wherein the threshold is associated with an average daily package amount.

15. A local device of a threat detection system for a mobile communication system, the threat detection system comprising a global device and the local device, the global device being located in a core network of the mobile communication system, the local device comprising:
> a network interface, being configured to connect to the global device;
> a processor, being electrically connected to the network interface and being configured to perform the following operations:
>> retrieving a plurality of training data, each of the training data being constituted by a plural of training flow data within a time interval at which numbers of packets per second are larger than a threshold;
>> transmitting the training data to the global device via the network interface to make the global device input the training data into a tensor neural network (TNN) model to train the TNN model and build a threat classifier, the threat classifier being used for identifying a plurality of threat types;
>> receiving the threat classifier from the global device via the network interface;
>> retrieving a plurality of to-be-identified flow data within another time interval at which numbers of packets per second are larger than the threshold to generate a to-be-identified datum; and
>> inputting the to-be-identified datum into the threat classifier to generate a classification result corresponding to one of the threat types.

16. The local device of claim 15, wherein each of the training data and the to-be-identified datum is a packet datum, and each of the training flow data and the to-be-identified flow data is represented by a three-dimensional coordinate system.

17. The local device of claim 16, wherein the three-dimensional coordinate system has a first dimension, a second dimension and a third dimension, the first dimension represents a first value constituted by a timestamp, the second dimension represents a second value constituted by a source internet protocol (IP) address, and the third dimension represents a third value constituted by a keep-alive field and a content-length field of a hypertext transfer protocol (HTTP) header and a sliding window field and a retransmission time-out field of a transmission control protocol (TCP).

18. The local device of claim 15, wherein each of the training data and the to-be-identified datum is a queue datum, and each of the training flow data and the to-be-identified flow data is represented by a three-dimensional coordinate system.

19. The local device of claim 18, wherein the three-dimensional coordinate system has a first dimension, a second dimension and a third dimension, the first dimension represents a first value constituted by a timestamp, the second dimension represents a second value constituted by a destination internet protocol (IP) address, and the third dimension represents a third value constituted by a number of reject-session times, a parsing time and a processing time.

20. The local device of claim 15, wherein the threshold is associated with an average daily package amount.

* * * * *